United States Patent Office 3,451,857
Patented June 24, 1969

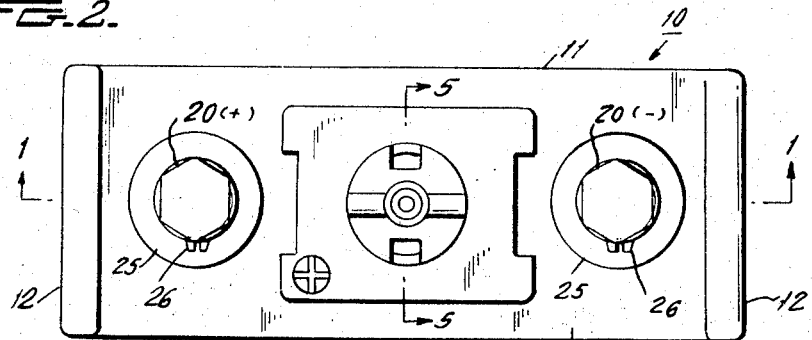
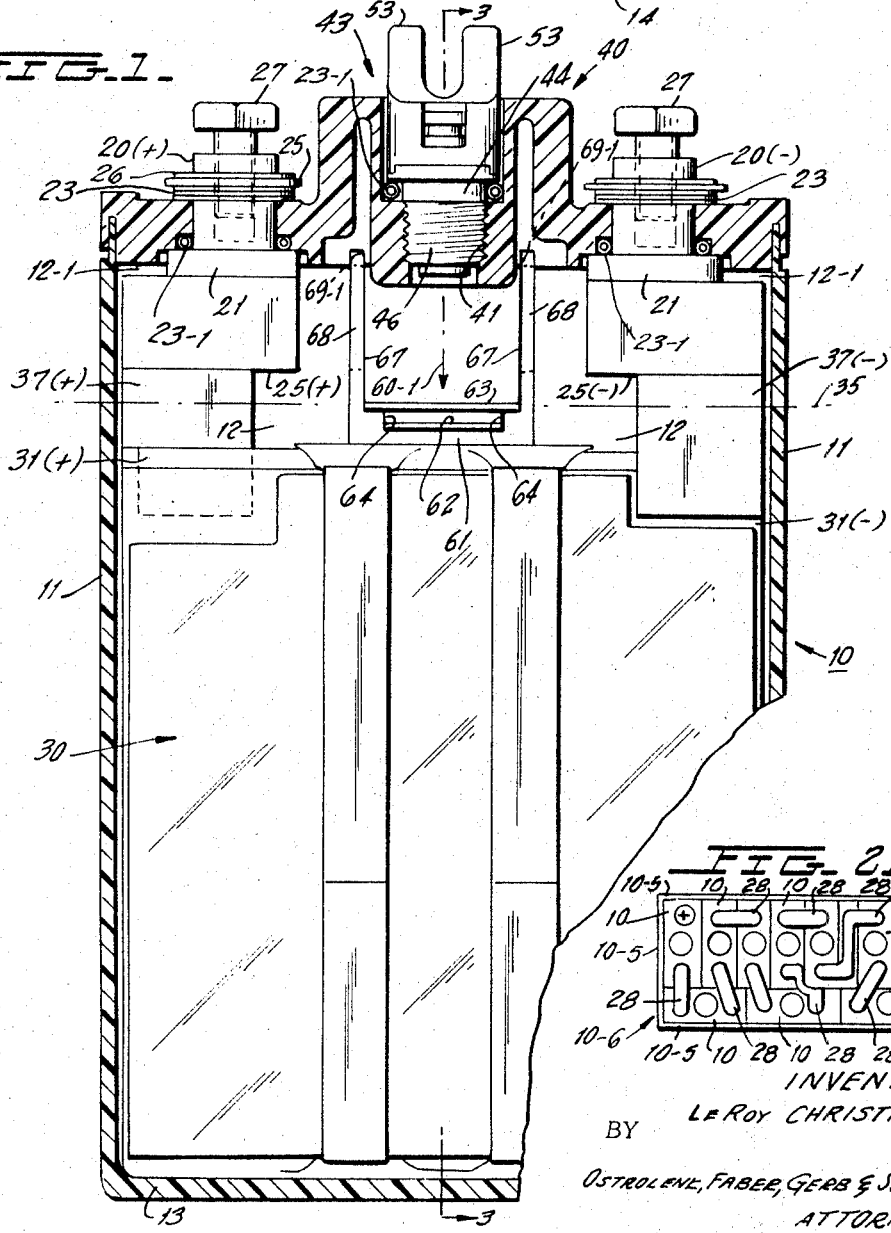

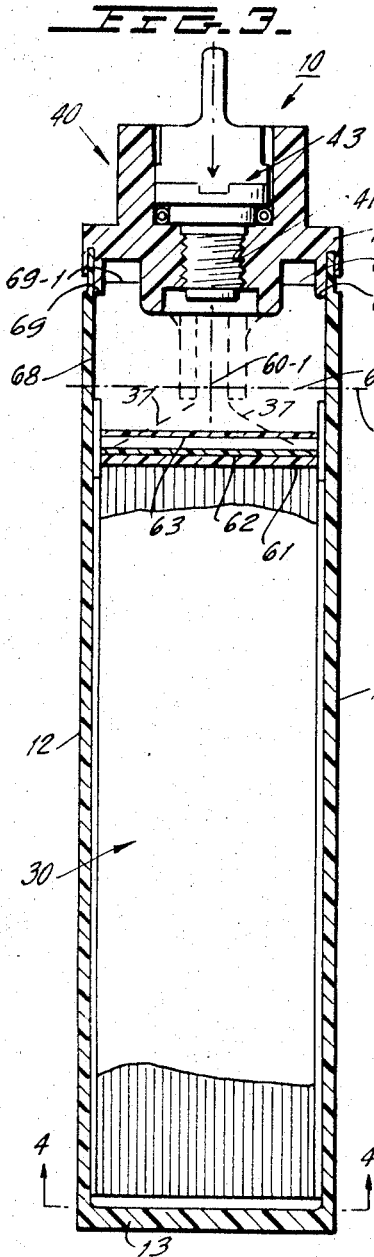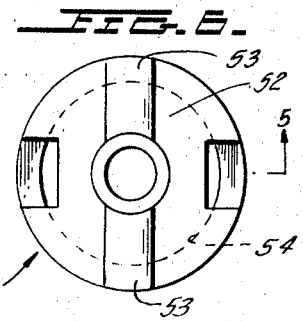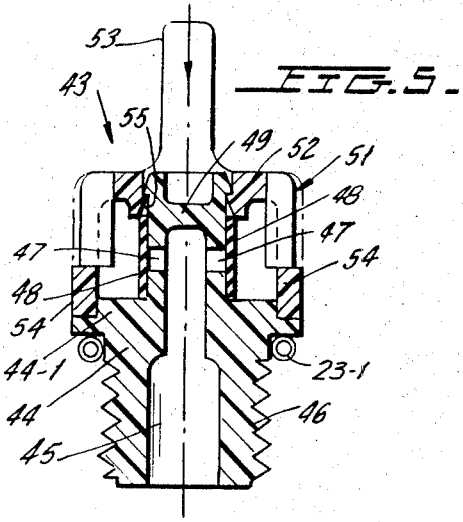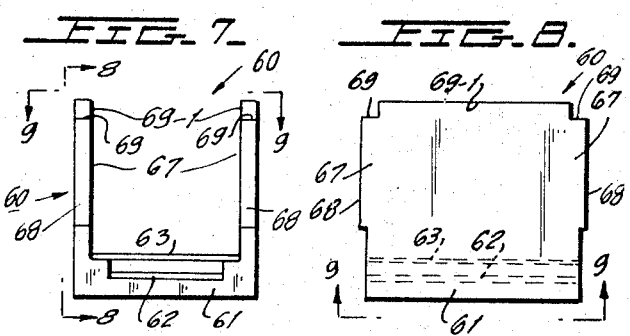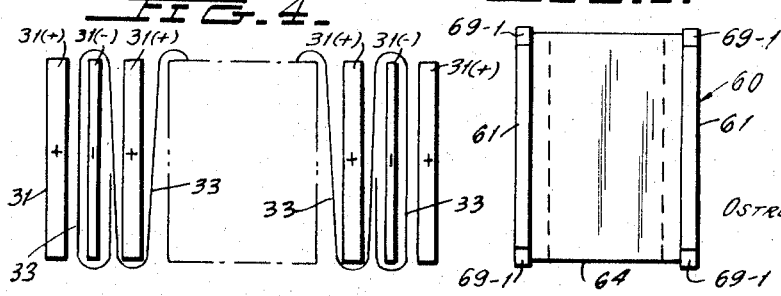

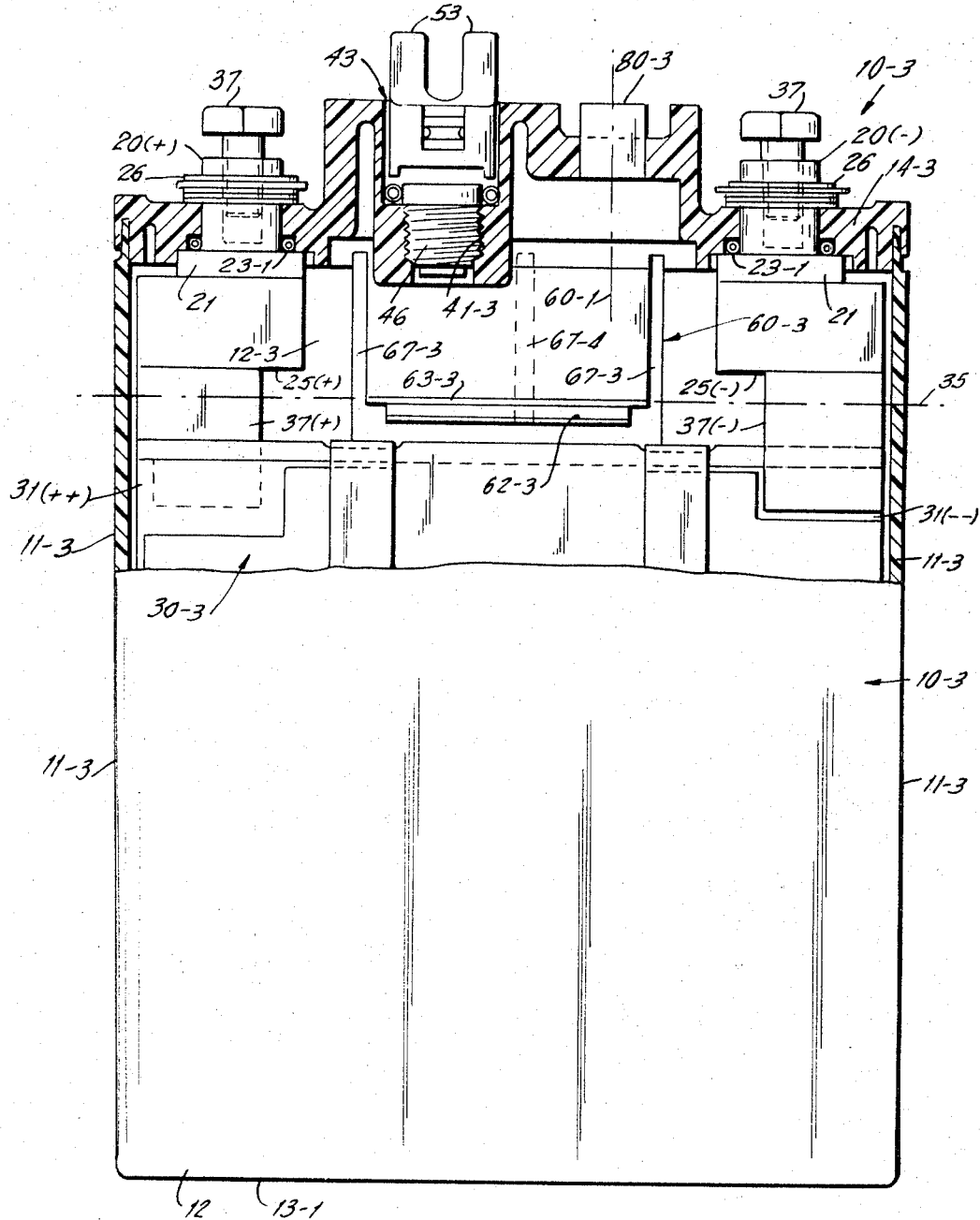

3,451,857
LIQUID LEVEL INDICATORS AND PARTICULARLY LEVEL INDICATORS FOR INDICATING THE ELECTROLYTE LEVEL IN VENTED RECHARGEABLE BATTERIES
Le Roy Christian, Garrison, N.Y., assignor to Sonotone Corporation, Elmsford, N.Y., a corporation of New York
Filed June 21, 1967, Ser. No. 647,726
Int. Cl. H01m 31/04
U.S. Cl. 136—182                        8 Claims

ABSTRACT OF THE DISCLOSURE

For indicating the level of liquid, such as the electrolyte level in the casing of a vented rechargeable battery, a light-reflecting inner layer reflects an exterior light beam through an overlying outer light transmitting layer only when the liquid in the casing is at a level high enough to fill the space between the two layers. The outer layer impedes transmission of the light from the inner light reflecting layer when the liquid drops below a level at which it fills the space between the two layers.

---

This invention relates to liquid level indicators for indicating the level of the liquid, such as the level of electrolyte liquid required for efficient operation of rechargeable batteries, for example, vented alkaline nickel-cadmium rechargeable batteries.

In a liquid indicator of the invention for a device, such as a rechargeable battery, a light reflecting inner layer body is held within the battery casing so as to reflect an exterior light beam through an overlying outer light transmitting layer only when the liquid in the casing is at a level high enough to fill the space between these two layers. However, the outer layer impedes or suppresses transmission of the light reflected from the inner layer when the liquid drops below the level of the outer layer or fails to fill the space between the two layers.

In known jet-engine starting batteries, the electrode assembly is enclosed in a casing having opposite sidewall portions which would deflect inwardly under reduced interior pressure. To suppress such inward casing wall deflection, a relatively rigid bracing member or block is held in deflection-suppressing engagement between the opposite sidewalls under the casing terminal wall. In such battery, the sidewall bracing block or member serves also as operative support for the two superposed layers for indicating the level of the electrolyte between the two so braced casing sidewalls. The casing terminal wall is provided with a light passage through which a light beam is transmitted through the two layers for determining by differences in the reflection of the light beam when the liquid has been restored to the level of the outer liquid level indicating light-transmitting layer.

The foregoing and other objects of the invention will be best understood from the following description of examples thereof, reference being made to the accompanying drawings wherein:

FIG. 1 is a vetrical cross-sectional view along lines 1—1 of FIG. 2 of one form of rechargeable nickel-cadmium battery cell having a liquid-level indicator exemplifying one form of the invention;

FIG. 2 is a top view of the cell of FIG. 1;

FIG. 2A is a top view of one typical form of an aircraft-jet-engine starting battery comprising a plurality of interconnected cells of the type shown in FIGS. 1 and 2;

FIG. 3 is a vertical cross-sectional view along line 3—3 of FIG. 1;

FIG. 4 is a diagrammatic view along line 4—4 of FIG. 3 indicating how a plurality of opposite-polarity electrode plates of an electrode assembly of such cells are held separated from each other by an electrolyte holding separator;

FIG. 5 is a cross-sectional view along line 5—5 of FIGS. 2 and 6 showing one typical form of a vent and filling opening closure used in the cell casing of FIGS. 1 to 3;

FIG. 6 is a top view of the filling opening closure of FIG. 5;

FIG. 7 is a view similar to FIG. 1 of the sidewall bracing block carrying the two layer liquid-level indicator exemplifying the invention;

FIG. 8 is a side view of the block along line 8—8 of FIG. 7;

FIG. 9 is a top view of the block along line 9—9 of FIG. 7; and

FIG. 10 is a view similar to FIG. 1 of another form of cell having a liquid level indicator exemplifying the invention.

Although applicable to other liquid containing devices, the present invention was evolved in connection with problems encountered with vented nickel-cadmium rechargeable batteries of the type which are widely used in the critical operation for starting the jet engines of military and commercial aircraft. An example of the invention will herein be described in connection with vented cells used in such batteries, although it is useful in various other applications.

Such jet engine starting nickel-cadmium batteries must deliver a very high engine starting current and must also be suitable for rapid recharging with high current density so that it is ready to deliver the large engine-starting current within a short time. As an example, one type of such starting battery, having a nominal voltage of 24 volts, must be able to supply 500 amperes starting current for five minutes with a maximum peak-starting current of 2,000 amperes. In addition, such nickel-cadmium battery must withstand charging at a very high current density so that—after being fully discharged—it will be fully recharged within half an hour. When such battery is charged at a high rate within a short time, some of the electrolyte within the battery casing is evaporated. For proper maintenance purposes, the electrolyte within the battery casing must be replenished through a filling opening to maintain the electrolyte at a predetermined close level range within the casing. Since such jet engine starting batteries must retain their full capacity in the vertically inverted position, the filling opening must be provided with a closure which keeps the casing normally sealed. This filling opening closure is normally combined with an excess-pressure vent which permits venting and escape of excess pressure gases during the rapid recharging process while maintaining the cell casing normally sealed against escape of electrolyte.

In a widely used battery of this type, a strong metallic casing holds assembled in engagement with each other a plurality of alike battery cells. The electrode assembly and electrolyte of each cell is enclosed in a rectangular-cross-section casing having four sidewalls with a bottom wall and open at the other end. The open end of the casing is sealed by a strong terminal wall carrying the electrode assembly and having the filling opening. Outward deformation of the cell casing side and bottom walls by excess gas pressure during rapid charging is prevented by the strong metallic casing engaging and enclosing the sides and bottom casing walls of the cell assembly. At least one pair of opposite casing sidewalls are thin enough so that under reduced interior pressure within the cell, sidewall portions will deform inwardly. A bracing member or block is placed between and abuts the opposite sidewalls to suppress such inward sidewall deformation.

In accordance with the invention, outer light transmitting and the inner light reflecting layer are carried by the cell wall bracing member across the light beam path under a light passage of the terminal wall for determining by observing the differences in the reflected light beam that the electrolyte in the cell casing has reached the required critical level. The light passage of the terminal wall may be distinct from its filling opening. However, the filling opening in the terminal wall of the cell casing may be utilized as the light passage for passing the light beam toward the two superposed layers for determining by the difference in the reflected light that the electrolyte has been replenished to the required critical level.

FIGS. 1 to 3 show one specific example of a rechargeable cell operating with an electrolyte level indicator of the invention. Although it may operate with any other type of electrode assembly and electrolyte, the specific battery is of the vented nickel-cadmium type. In all nickel-cadmium rechargeable cells, the discharged positive electrode mass consists of nickel (II) hydroxide—$Ni(OH)_2$—which when fully charged is converted into nickel (III) hydroxide—$NiO(OH)$—having nickel in a higher oxidation state. The discharged negative electrode mass of such cell consists of cadmium (II) hydroxide—$Cd(OH)_2$—which when fully charged is converted into metallic cadmium.

Since 1950 most rechargeable nickel-cadmium battery cells have been made with sintered nickel-powder electrode plates containing in their pores the respective active electrode material, such as described in Koren et al. Patent 2,708,212 or the article by Arthur Fleischer in "Transactions of the Electrochemical Society," vol. 94, copyright 1948, pp. 289–299 and the references listed therein. However, these active electrode materials may be combined with the metallic support sheets of such negative and positive plates in any other known manner. For instance, the cadmium and its compound may be combined with a metallic support sheet in any known way, as by cathodic electrodeposition, to provide the negative electrode plate of desired capacity. The nickel hydroxide compound may be formed on a metallic support sheet by any known way to provide the positive electrode plate. See, for instance U.S. Patent 2,162,385 and the article "The Nickel Oxide Electrode" by G. W. D. Briggs, E. Jones and W. F. K. Jones in Transactions of the Faraday Society, vol. 51 (1955), pp. 1422–1433. As an example, the following procedure may be used for forming a nickel hydroxide active coating on a nickel sheet 0.13 to 0.3 millimeters thick. Thus, the thin nickel sheet is enclosed in a porous polyethylene sheet 0.7 millimeter thick having an average pore size between about 10 to 200 microns. The nickel sheet is used as an anode in an aqueous electrolyte containing 60 to 400 grams of sodium borate and 15 to 35 grams of boric acid per liter at 50 to 65° C. and pH of 8. The electrolytic process with an associated cathode and a current density of 150 to 400 microamperes per square centimeter is carried on as long as the formation of the nickel hydroxide compound on the nickel sheet continues. As an example, in an electrolyte containing 90 grams sodium bicarbonate per liter with a pH 8 at 60° C. and an electrolytic current of 200 microamperes per square centimeter, substantially the full thickness of the active positive coating, is formed on the nickel sheet within two hours. In charge and discharge cycles, the so formed active coating had a capacity of 10 microampere hours per square centimeter. By subsequent similar anodic electrolytic treatment for four hours of the so activated nickel sheet in an identical electrolyte but without the porous enclosure, the capacity of its active electrode coating was increased to 25 microampere hours per square centimeter.

FIGS. 1–3 and its associated FIGS. 2A and 4–9 show one form of nickel-cadmium battery cell assembly 10 embodying an example of electrolyte liquid level indicator of the invention. The cell is shown held in vertical position, but in operation it may be held in any other including an inverted position. It comprises a flat casing of rectangular shape having two narrow and two wide sidewalls 11, 12 formed integrally with a bottom wall 13 and completed by a casing top or cover wall 14. The casing walls 11 to 14 may be formed of suitable alkali-resistant synthetic polymer material, such as nylon, polyethylene, polyesters, etc.

Within the space of casing 10 is enclosed an electrode assembly 30 comprising in the specific cell a plurality of porous positive and negative electrode plates 31(+), 31(−) which are separated by an electrolyte holding space or porous spacer 33. The electrode assembly 30 and its elements are permeated by and immersed in an electrolyte liquid which fills almost the entire casing space, for instance, about ¼ to ½ inch above the upper level of the electrode assembly 30 or at the liquid level 35 (FIGS. 1 and 3). The electrolyte 35 consists of an aqueous solution of potassium hydroxide (or sodium hydroxide). Good results are obtained with 20 to 35 weight percent of the solution of potassium hydroxide.

To secure foolproof charge and discharge operations at high current density with such nickel-cadmium battery cells it been found of critical importance to use a porous electrolyte pervious separator 33 having a continuous thin microporous plastic film pervious to electrolyte and electrolytic current backed on both sides by a strong fabric and resisting corrosion by the alkaline electrolyte. Good results are obtained with a separator 31 consisting of a thin plastic film of regenerated cellulose without a plasticizer, such as cellophane, held between two thin nylon fabrics. Other suitable separators are described in U.S. Patent 2,696,515. The separator sheet 33 has a width slightly greater than the vertical height of the electrode plates 31(+), 31(−) as seen in FIGS. 1 and 3 and overlaps, for instance, by about ⅜ inch the upper and bottom edges of each such electrode plate 31 (FIGS. 1 and 3). Such separator sheet formation 33 is made long enough for assembling a stack of opposite-polarity electrode plates 31(+), 31(−) in superposed relation—as seen diagrammatically in FIG. 4—with successive sections of the long separator formation 33 folded in zigzag fashion in opposite directions around the side edges of the so superposed or overlapping electrode plates 31(+), 31(−).

As seen in FIGS. 1, 2 and 3, the battery top or cover wall 14 is relatively rigid and is provided with a generally rectangular border portion arranged to interfit within the adjoining open end of the battery cell casing 10. The interfitting surfaces of the top wall 14 and cell casing walls 10 are hermetically joined to each other as by a suitable alkali-resistant cement as by heat sealing.

Within the top wall 14 are mounted and held fixed and sealed therethrough with a fluid-tight seal, two metallic terminal members, or posts, 20(+) and 20(−) of opposite polarity providing terminal connections to the opposite polarity battery plates 31(+), 31(−) of the electrode assembly. Each of the two terminal members 20 is made in the form of a metal shank, passing through an opening within the insulating top wall 14 and having on its inner side an enlarged shank wall or head 21 held seated across an elastic sealing washer or ring-shaped O-tube 23–1, of alkali resistant rubber material, such as neoprene, against the overlying seating surface of the top wall bordering the opening thereof. The shank head 21 is held clamped against the cover wall 14 by an assembly of superposed metal washers 23 including a metallic split-ring-locking washer 26 which is interlockingly sprung into a groove of the shank 21. The washer assembly 23 includes a lowermost flat washer and two overlying oppositely directed convex washers (of the Belleville type) which are axially compressed against the cover wall 14 by the split-ring washer 26 across an underlying thick washer 25. The threaded shank of a known type of clamping bolt 27 engages threaded walls of the two terminal shanks 20 and serves to clamp thick metallic connector bars 28 (FIG. 2A) from similar terminal shanks of adjacent cells 10 or terminal connector of an external charge or discharge circuit.

Before combining the positive and negative plates 31(+), 31(−) and their separator 33 into the electrode assembly 30, flexible metallic connector tabs 37(+), 37 (−), made for instance of nickel, has its inward end metallically joined, as by electric weld connections, to a metallically conductive corner edge portion of each respective positive and negative electrode plate 31(+), 31(−). The opposite free end of each electrode tab 37(+), 37(−) projects above the upper edge of the respective plate (as seen in FIGS. 1 and 3) and is long enough to reach the inward metallic terminal connector lugs 25(+), 25(−) of the respective polarity terminal posts 20(+), 20(−) held by cell cover 14. The respective terminal lugs 25(+), 25(−) may be formed of nickel or another good conductive metal electroplated with a thick dense and solid coating of nickel having its central portion welded or forming a central part of inner sealing head 21 of the respective terminal shank 20(+), 20(−). The positive and negative electrode plates 31(+), 31(−) are alternately assembled with their separator 33 so that all the positive electrode tabs 37(+) are aligned in overlapping relation for electrically welding thereto with the positive terminal post connector lugs 25(+); and all negative connector tabs 37(−) are aligned in overlapping relationship with the negative terminal post connector lugs 25(−) for electrically welding thereto. This is done while the cover 14 with the electrode assembly having its electrode tabs 37(+), 37(−) welded to the terminal posts 20(+), 20(−) is still outside the battery casing.

The cell cover wall 14 has a venting section 40 with a filling opening or passage 41 through which electrolyte is supplied to the casing interior for maintaining the desired electrolyte level 35. The venting section 40 with its opening passage 41 projects above the surrounding portions of cover wall 14. The cover opening 41 is normally closed by a vent member 43 which may be formed wholly or partially of solid gas-tight material, such as metal or polymer material. The vent member 43 is provided with any known type of vent opening which is closed by any known type of closure body arranged to maintain the vent opening closed for internal casing pressures below a predetermined level and to open the vent opening when the internal casing gas pressure exceeds such predetermined level described, for instance, in U.S. Patent 2,708,212 (Koren et al.). The specific vent member 43 shown is made of a solid polymer material such as nylon.

Referring to FIGS. 1, 3, 5 and 6, vent member 43 comprises an inner vent section 44 and an outer vent section 51 which are affixed to each other and may be formed as an integral body. Inner vent section 44 has a generally coaxial vent passage 45 and a threaded inner end portion 46 normally affixed within the surrounding threads of the cover opening 41. When the removable vent member 43 is affixed in the sealed position with cover-wall filling opening 41, it compresses a surrounding elastomer or O-tube washers 23–1 between facing portions of vent member 43 and cover wall for securing a gas-tight seal along then engaging facing body surfaces. Along the outward end of its axial vent passage 45, the surrounding sidewalls of the inner vent section have transverse vent passages 47 to the exterior space for discharging vapor or gases from the casing interior 12–1. The vent passages 47 of vent sections 44 are normally closed or sealed by a vent closure 48 which prevents escape of gases or fluid below a predetermined raised pressure level in the casing interior 12–1 but which releases their seals when the internal gas pressure exceeds such level. The specific vent closure 48 consists of a stretchable tubular section of an elastomer or rubber tube which has to be stretched for seating it under sealing pressure around the tubular portion of the vent section 44 having the vent passages 47. The substance and thickness of the tubular vent closure 48 are chosen to provide the selective sealing of the vent passages 47 as described above.

The upper end region of inner vent section 44 (FIGS. 5 and 6) is surrounded by and affixed to the outer section 51, the top 52 of which is provided with one or more grip projections 53 with which the combined vent member 43 may be unthreaded and removed from the cover opening 45 or sealingly replaced therein. The top wall 52 of outer vent section 51 is integrally formed with sidewalls 54 surrounding the interfitting upper region 49 of inner vent section 44. The top wall 52 of upper vent section 51 has also a passage 55 coaxial with inner-vent-section passage 45. The upper-vent-section passage 55 is formed by an upwardly and inwardly tapering interlocking wall region which is affixed in interlocking engagement with a complementary surrounded upper end region portion 49 of inner vent section 44. The outer surfaces of upper end 49 of inner vent section 44 is rounded and like the outer vent section 51 is formed of a polymer solid so that their complementary interlock wall regions 49, 55 are elastically deformed for remaining fixed and interlocked (FIGS. 5, 6) while permitting the elastic outward deformation of the upper end section 49 of inner vent section 44 which passes through the narrower passage opening 55 of outer vent sections 51 as they are moved from a disassembled or separated condition into their assembled position seen in FIG. 5 and FIGS. 1 and 3.

A suitable number of interconnected vented nickel-cadmium battery cells 10 of the type shown and described above are usually combined into a multi-cell battery 10–4 as seen in the top view of FIG. 2A. As described above, the individual casings 10 of such cells are made with thin plastic polymer sidewalls 12 which would bulge outwardly under the large internal casing pressure when the cell is charged at high current density to assure full rapid charging of a discharged battery so that it may be used as soon as possible. Such outward cell-wall bulging is suppressed by assembling the cells 10 in side-by-side relation, as seen in top view of FIG. 2A, and embracing the cell assembly by engaging and surrounding casing sidewalls 10–5 and the bottom wall of a strong metallic casing of steel, for example.

It has been found that in operation the internal gas pressure within the casing 10 of such cells is reduced below the surrounding atmospheric pressure. Under such reduced inner pressure, the flexible sidewalls 12 of such cell casing 10 which are not backed by the electrode assembly 30 deform inwardly or cave-in. To suppress such inward deformation of the thin wide and flexible cell casing sidewalls 12, such cells are provided with a deformation-resistant bracing member 60 of suitable plastic material, such as nylon, extending between and abutting the two casing sidewalls 12 and fitting into the casing space between the central portion of the cover wall 14 and the underlying electrode plate assembly 30 held seated on or abutting the casing bottom wall 13. The specific casing wall bracing member or structure 60 shown (FIGS. 1, 3 and 7 to 9) has a transverse wall 61 abutting against the underlying end region of the electrode assembly 30 and two opposite bracing sidewalls 68 abutting with its opposite edge surfaces 68 of substantial width and height against the casing sidewalls 12 in the region adjoining the top wall 14 for preventing or suppressing inward deformation of the engaged regions of casing sidewalls 12 under reduced pressure within the sealed cell casing 10. The opposite upper corners of each bracing sidewall 67 has a rectangular recess 69 which reduces the width of their respective end regions 69–1 for entry and interlocking seating engagement with overlapping downward seating flanges 14–1 of cover wall 14 (FIG. 3). These bracing sidewall recesses 69 enable proper aligned positioning of the sidewall bracing member 60 between the casing cover 14 and the upper edge region of the electrode assembly 30. The upwardly facing surface of the transverse bracing member wall 61 extends transversely or perpendicularly to a vertical light transmission and vision path indicated by dash-dot line 60–1 which is axially aligned with the light-transmitting wall passage 41 of casing top wall 14 which serves also as the electrolyte refilling opening thereof.

In accordance with the invention, this upper surface of the transverse bracing wall 61 is utilized as the inner light reflecting surface layer causing light transmitted from the exterior of the battery cell through the cover wall passage 41 along light path 60–1 to be reflected back to the exterior of the casing for indicating to a light observing means, such as an observer's eye or a photocell, a light beam of a distinct color reflected by the surface of such bracing wall member 61 to the exterior of the casing top wall 14. A distinct light reflecting characteristic is given to the upwardly facing surface of the transverse bracing wall 61 by placing thereon a thin film of polymer substance such as nylon which has been given a distinct color—for instance black, red, orange or the like—shown in FIGS. 1, 3 and 7 as a light reflecting surface layer 62 placed at or slightly below the level at which the normal electrolyte level 35 is to be maintained within the cell casing 10. In addition, slightly above the distinct color light reflecting layer 62, approximately at the liquid level to be maintained in cell 10, is held an outer light transmitting layer 63 through which light passing from the exterior to the cover wall passage 41 of casing wall 14 along light path 60–1 is transmitted through the light transmitting layer 63 to the underlying light reflecting layer 62 of distinct color for reflecting back along path 60–1 the colored light beam of inner layer 62 to the eye or to a photocell not shown on the exterior of cover wall 14.

For maintaining the level of the electrolyte within the casing at the level indicated by dash-double-dot line 35 good results are obtained by placing the outer light transmitting layer 62 approximately ⅛ inch above the inner light reflecting layer 61 within the cell casing. In practice good results are obtained by spacing the light transmitting outer layer 63 about ⅛ inch from the inward light reflecting layer 62 at the region of the electrolyte level 35 to be maintained within the cell casing 10. Good results are obtained by making the light transmitting layer 63 of a thin sheet of translucent nylon or other analogous alkali-resistant plastic material which transmits light along light beam 60–1 from the exterior of the cell to the underlying light reflecting layer 62 and enabling observation of the distinct colored light reflected back from the light reflecting layer 62 through the light transmitting layer 63 along light path 60–1 through the light passage 41 to the exterior of the cell—when the level of the electrolyte reaches the level of the outer light-transmitting layer 63.

By providing the inwardly facing regions of the junctions of the two bracing sidewalls 67 to its transverse bracing wall 61 with the corner ledges 64 for seating thereon the somewhat wider light transmitting layer 63 of the electrolyte level indicating device of the invention, their proper relative positioning at the desired liquid electrolyte level 35 within the cell casing is achieved in a very simple way. The frictional engagement of the edges of the light transmitting layer 63 and the light reflecting layer 62 of the liquid level indicating device secures their properly spaced seating and retaining engagement within their supporting structure 60 in the interior of the casing 10 for indicating whether the electrolyte liquid within the casing is maintained at the desired level 35. Thus, upon removal of the vent structure 43 from the light passage and filling opening 41 of the cover wall 14, a beam of light passing along the light path 61 will strike the light reflecting layer 62 for reflection back through the light transmitting layer 63 along light path 60–1 to the exterior of the casing for indicating that the electrolyte liquid within the cell casing 10 is at the required level 35. If the electrolyte level within the casing is below the level of the light transmitting layer 63, this light transmitting layer 63 will not reflect light from the underlying light reflecting layer 62 because the electrolyte within the interior of the casing does not fill the space between the light transmitting layer 63 and the underlying light reflecting layer 62. However, as soon as additional electrolyte has been added through filling opening 41 to the interior of cell casing 10 to reach the level of the light transmitting layer 63 at the desired electrolyte level 35, light transmitted from the exterior along light paths 60–1 and through light-transmitting layer 63 to the distinctly colored light reflecting layers 62, it will be reflected back along this path through the liquid filling the space between these two layers through the exterior layers 63 and along light path 60–1 to the exterior and indicate the distinct color of the reflected light and show that the electrolyte within the cell casing 10 is at the proper casing level 35.

It is obvious that the side edges of the light reflecting layer 62 and light transmitting layer 63 as seen in FIG. 3 may be mounted in other ways at the proper level and spacing within the casing 10, for instance, by being retained at the required liquid level and relative spacing, as described above, between two two bundles of electrode tabs 37(+), 37(−) before the electrode assemby 30 with the cover 14 have been inserted into the cell casing 10.

To enable ready production of liquid-level indicator devices of the invention in connection with vented nickel-cadmium battery cells, such as described above, a specific type of such cell described in connection with FIGS. 1–3 and provided with a liquid indicator device exemplifying the invention will now be described.

The cell casing 10 with its cover 14 are made of nylon. Its electrode assembly 30 has a plurality of alternately superimposed positive and negative electrode plates 31(+), 31(−) which are 5″ high and 4¾″ wide. The casing 10 is of nylon and has sidewalls 12³²⁄₃₂″ thick, and a bottom wall ⅜″ thick. In the region of its terminal shanks or posts 20(+), 20(−), the casing cover wall 14 is ½″ thick and its opening wall section 40 projects ¾″ above the major exterior flat surface of cover wall 14. The bracing member 60 (FIGS. 1, 2 and detail FIGS. 7 to 9) is integrally molded of nylon with a transverse wall 61 and two bracing sidewalls 67 each ⅛″ thick. The two bracing sidewalls (FIGS. 1 and 7 to 9) are laterally spaced from each other by 1″. It operates with an example of the liquid level indicator of the invention having a light transmitting or translucent outer layer 63 formed of uncolored nylon and an underlying colored nylon surface layer 62, each ⅟₆₄″ thick separated from each other in the direction of light path 61–1 by ⅛″.

The presence of the desired volume of electrolyte at the casing level 35 (FIGS. 1 and 3) is determined by removal of casing closure and vent member 43 and by observing the light beam passing from the exterior through cover-opening light passage 41 reflected from the superposed liquid level indicating layers 63, 62. As long as the electrolyte in the casing 10 is below the first or outer light transmitting layer 63, the light beam will be reflected therefrom showing the grayish surface of uncolored nylon. As soon as the electrolyte is replenished to reach the level of outer light-transmitting layer 63 or fills the spacing between the two layers 62, 63, the light beam along path 60–1 after passing the outer layer 63 will be transmitted to the characteristic color reflecting second or inner layer 62 and its distinct color will be reflected back along path 60–1 through the liquid filled space between the two layers and the outer transmitting layer 63 and through the cover light passage 67 to the observer's eye or a photocell sensitive to the distinctly colored light beam reflected by the inner light reflecting layer 62 having a distinct color. In practice, good results are obtained by giving the inner light reflecting surface layer a black color so that the reflected black light indicates that the casing 10 contains the required volume of electrolyte liquid.

The specific nickel-cadmium battery cell described above in connection with FIGS. 1 to 3 had the following performance requirement:

| | |
|---|---|
| Rating | Minimum of 75 ampere hours. |
| Open circuit voltage at 25° C. | 1.32 ± 0.04 volt within 2 hours after end of full charge. |
| Charging temperature range | 40° C. to ± 50° C. |
| Discharging temperature range | 40° C. to ± 71° C. |
| Vent release pressure | 10 to 20 p.s.i. |
| Charging: | |
| Rate | 150 ampere maximum. |
| Voltage | 2.083 volts maximum. |
| Time | 42 minutes maximum. |
| Discharge: | |
| Rate | 30 amperes. |
| Time | 2½ hours maximum. |
| To end point voltage | 1.05 volts minimum. |
| Float current | 2.5 ± 0.5 ampere without loss of capacity at battery temperature not exceeding 55° C. |
| Cycle life | At least 1200 cycles with 100% discharge to minimum discharge voltage of 1.05 volts. |

In the cell of FIGS. 1 to 3, the light transmitting passage of cover wall 14 along light path 60–1 consisted of the cover filling opening passage 41. However, the electrolyte level indicator devices of the invention may use a light passage of the cover wall which does not coincide or is distinct from the cover filling opening.

FIG. 10 shows in a view similar to FIG. 1 a similar nickel-cadmium battery cell having an identical electrolyte level indicator except that it uses a cover-wall light and viewing passage distinct from the cover-wall filling opening. The elements of the cell of FIG. 10 are in every other respect identical with those of the cell of FIGS. 1 to 3, except that its electrode plates 31 (++) and 31(— —) have a greater width than the electrode plates 31(+), 31(—), FIGS. 1 to 3. Its casing sidewalls 12–3 which overlie its wide electrode plates are correspondingly wider and they are braced against inward deformation by a bracing member 60–3 having a correspondingly greater width as seen in FIG. 10. The wider bracing member 60–3 may have one or more intermediate upright bracing walls indicated by dash lines 67–4 in addition to the two upright bracing walls 67–3 (corresponding to bracing walls 67 of FIGS. 1–3) which abut with their opposite end faces the wide casing sidewalls 13–3. The electrolyte in the cell casing 10–3 is to be maintained at the level of dash-dot line 35 as in the cell of FIGS. 1 to 3.

The liquid level indicator of the invention used in the cell of FIG. 10 has a more inward light reflecting layer 62–3 and an overlying light transmitting layer 63–3 separated by a small spacing and held transversely to an upright light path 60–1 in a position of the desired liquid level 31, for instance, in the same manner as in the cell of FIGS. 1 to 3. However, these two layers 62–3, 63–3 may extend, for instance, only over the region between the intermediate bracing wall 67–4 and the rightward bracing wall 67–3 as seen in FIG. 10. The light passage in the casing cover wall 14–3 is formed not by its electrolyte filling opening 41–3, but by a solid portion of the cover wall in which is sealed an efficient light beam transmitting plastic body 80–3, for instance, of a methyl methacrylate plastic, such as available under the trademark Lucite.

The above-described examples of electrolyte-liquid-level indicator devices suitable for use in nickel-cadmium battery cells will suggest various modifications thereof and the claims shall not be limited thereto.

There is claimed:

1. In a liquid level indicator for indicating the level of liquid within a liquid refillable casing of rechargeable battery cell and other devices, which casing has a casing wall with a light-transmitting wall passage,
a light transmitting first layer and a second lower light reflecting surface layer held at a first and a second lower liquid level within said casing and both said layers extending transversely to a light transmission path passing through said wall passage into the casing interior transversely to said casing wall,
said first layer having the property of suppressing reflection of light along said path from said second layer to said wall passage in the absence of liquid filling the layer spacing between said two layers,
said second layer having predetermined light reflecting characteristics and the property of causing a light beam passing along said path through said wall passage to be reflected by said second layer back along said path to said wall passage when said layer-spacing is filled with liquid as an indication that the liquid reached said first level.

2. In a liquid level indicator for devices as claimed in claim 1,
said casing wall having a normally closed wall opening through which liquid is admitted to said casing while open,
said wall opening constituting said light passage while said opening is open.

3. In a liquid level indicator for devices as claimed in claim 1,
said casing wall having an opening for admitting liquid to said casing while open and also said light-transmitting wall passage distinct from said wall opening.

4. In combination with a liquid containing ventable and refillable casing having one casing wall and at least two spaced opposite sidewalls extending transversely to said one wall and subject to inward deformation under reduced pressure in the casing interior,
said one casing wall having a light transmitting wall passage for passing exterior light along a light path transverse to said one casing wall into the casing interior,
and a bracing body underlying said one casing wall and engaging with opposite surfaces the opposite interior surfaces of said two sidewalls and opposing inward deformation of said sidewalls,
of indicator means for indicating the liquid level in said casing comprising
a light transmitting first layer and a second lower light reflecting surface layer held at a first and a second lower liquid level within said casing and both said layers extending transversely to said light path and carried by said bracing member,
said first layer having the property of suppressing reflection of light from said second layer to said wall passage in the absence of liquid filling the layer spacing between said two layers,
said second layer having predetermined light reflecting characteristics and the property of causing a light beam passing along said path through said wall passage to said second layer to be reflected by said second layer along said path to said wall passage when said layer-spacing is filled with liquid as an indication that the liquid reached said first level.

5. In a liquid level indicator for indicating a desired liquid level in a rechargeable battery cell a casing having a casing wall with a normally closed liquid admitting wall opening including a vent for releasing excess pressure gases from said casing, an electrode assembly within said casing having at least two opposite-polarity electrodes held apart by a separator space and electrolyte liquid held within said casing at a predetermined level range for maintaining electrolytic charge and discharge operations between said electrodes across said separator space said level indicator comprising a first light transmitting layer at a predetermined first liquid level and a second light reflecting layer spaced by a layer spacing below said first layer within said casing with both of said layers extending transversely to light transmission path extending transversely to said casing wall through said wall opening into the interior of said casing, said first layer having the property of suppressing reflection of light along said path from said second layer to said opening in the absence of liquid filling the layer spacing between said two layers, said second layer having predetermined light reflecting characteristics and the property of causing a light beam passing along said path through said opening to be reflected by said second layer back along said path to said wall opening when said layer-spacing is filled with liquid as an indication that the liquid reached said first level.

6. In combination with a rechargeable battery cell having a liquid level indicator as claimed in claim 5, said casing having at least two spaced sidewalls extending transversely to said casing wall and subject to inward deformation of said opposite sidewalls, a bracing body underlying said one casing wall and engaging with opposite surfaces the opposite interior surfaces of said two sidewalls and opposing inward deformation of said side walls, said first light-transmitting layer and said second light reflecting layer being carried by said bracing body along said light path within said casing.

7. In a liquid level indicator for indicating a desired liquid level in a rechargeable battery cell, a casing having a casing wall with a light-transmitting wall passage and a normally closed liquid admitting wall opening including a vent for releasing excess pressure gases from said casing, an electrode assembly within said casing having at least two opposite-polarity electrodes held apart by a separator space and electrolyte liquid held within said casing at a predetermined level range for maintaining electrolytic charge and discharge operations between said electrodes across said separator space, said level indicator comprising a first light transmitting layer at a predetermined first liquid level and a second light reflecting layer spaced by a layer spacing below said first layer within said casing with both of said layers extending transversely to light transmission path extending transversely to said casing wall through said wall passage into the interior of said casing, said first layer having the property of suppressing reflection of light along said path from said second layer to said opening in the absence of liquid filling the layer spacing between said two layers, said second layer having predetermined light reflecting characteristics and the property of causing a light beam passing along said path through said wall passage to be reflected by said second layer 8. In combination with a rechargeable battery cell having a liquid level indicator as claimed in claim 5, said casing having at least two spaced sidewalls extending transversely to said casing wall and subject to inward deformation of said opposite sidewalls, a bracing body underlying said one casing wall and engaging with opposite surfaces the opposite interior surfaces of said two sidewalls and opposing inward deformation of said sidewalls, said first light-transmitting layer and said second light reflection layer being carried by said bracing body along said light path within said casing.

References Cited

UNITED STATES PATENTS

| 461,370 | 10/1891 | Seidensticker | 73—327 |
|---|---|---|---|
| 2,631,182 | 3/1953 | Hall et al. | 116—118 |
| 2,943,530 | 7/1960 | Nagel | 73—327 |

WINSTON A. DOUGLAS, *Primary Examiner.*

D. L. WALTON, *Assistant Examiner.*

U.S. Cl. X.R.

73—293, 327; 116—118